Dec. 3, 1940.   J. DE FRANCISCI   2,223,351
APPARATUS FOR PRODUCING ALIMENTARY PASTE PRODUCTS
Filed Dec. 6, 1938   2 Sheets-Sheet 1
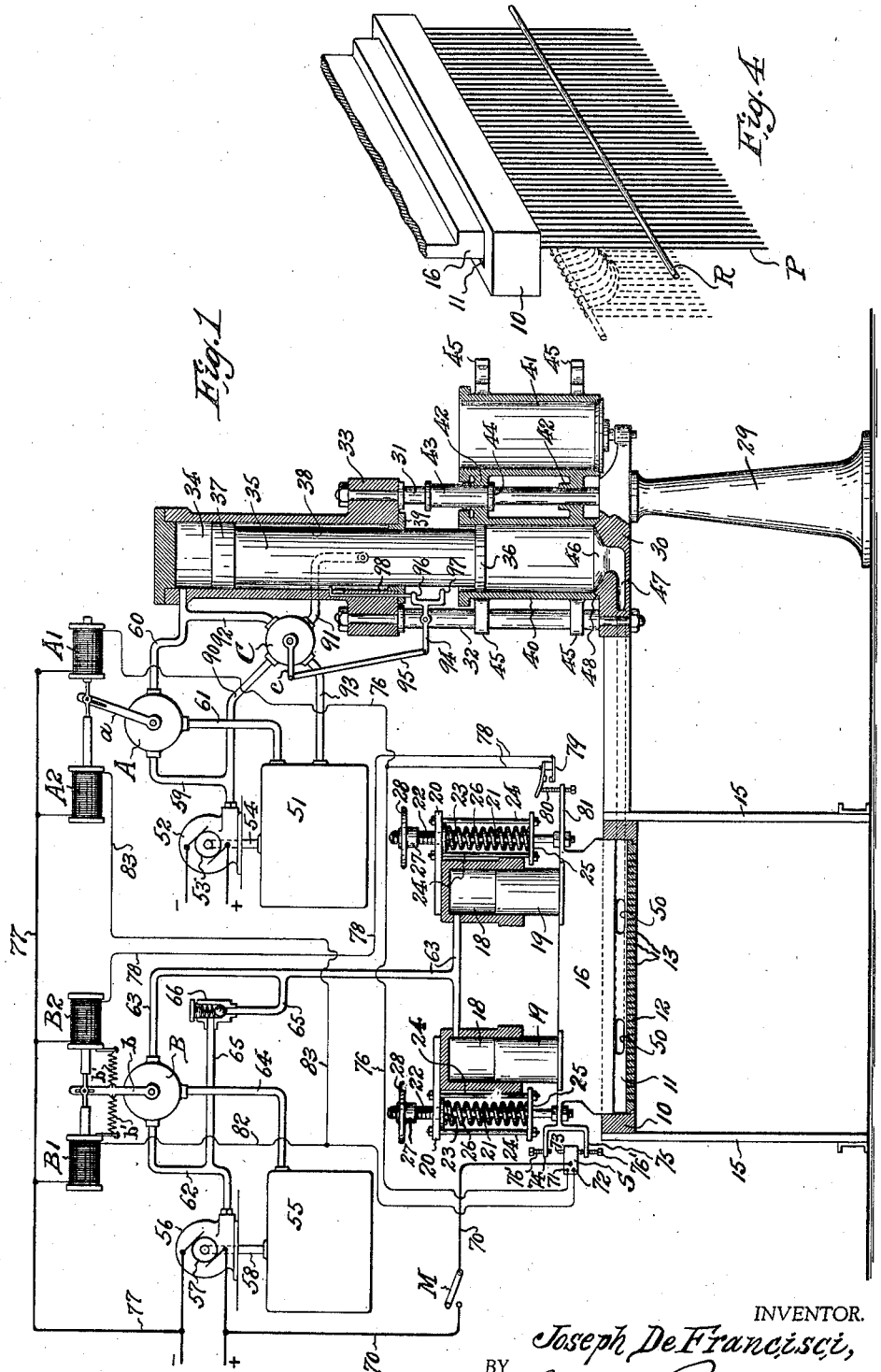
INVENTOR.
Joseph DeFrancisci,
BY George D. Richards
ATTORNEY.

Dec. 3, 1940.   J. DE FRANCISCI   2,223,351
APPARATUS FOR PRODUCING ALIMENTARY PASTE PRODUCTS
Filed Dec. 6, 1938   2 Sheets-Sheet 2
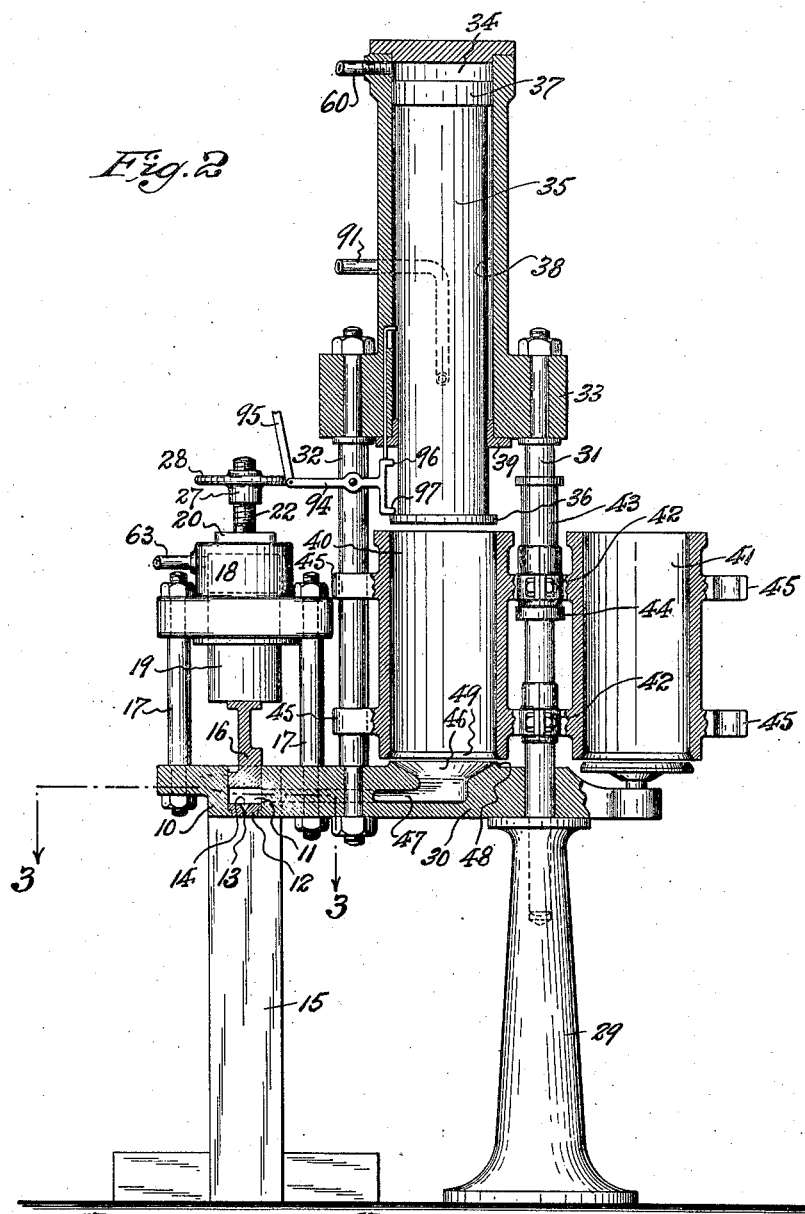
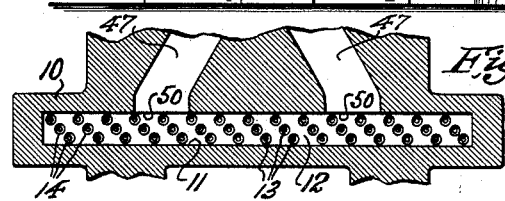
INVENTOR.
Joseph De Francisci,
BY George D. Richards
ATTORNEY.

Patented Dec. 3, 1940

2,223,351

UNITED STATES PATENT OFFICE 2,223,351

APPARATUS FOR PRODUCING ALIMENTARY PASTE PRODUCTS

Joseph De Francisci, Brooklyn, N. Y.

Application December 6, 1938, Serial No. 244,198

8 Claims. (Cl. 107—14)

This invention relates to a novel apparatus for producing alimentary paste products, such as spaghetti, macaroni, and the like.

In the manufacturing processes by which long alimentary paste products, such as spaghetti, macaroni, etc., are commonly produced, hydraulic presses are employed to extrude the dough through perforate dies to thereby produce strings of suitable length. Hydraulic presses, as heretofore employed, comprised cylindrical dough chambers cooperating with circular die plates providing concentric rows of die openings, and consequently the strings of paste would be extruded in the form of substantially cylindrical groups or clusters, which, when cut away adjacent to the exterior faces of the die plates, required the operators to manually separate the individual strings when applying the same over and spacing the same linearly along supporting rods preparatory to racking the products for drying. The latter operations are not only laborious and time consuming, but also are not efficiently sanitary since they require a considerable amount of handling of the product by the operators.

It is an object of this invention to provide a novel machine for producing long alimentary paste products, in which the paste or dough is extruded in a plurality of strings of desired number in linearly disposed and spaced relation ready for immediate application to a supporting rod used in the racking of the product for drying, and in which the dough is divided into batches for extrusion, each batch comprising that amount of dough sufficient to produce a plurality of linearly spaced strings of a number adapted to accord with the capacity of drier racking rods upon which the same are desired to be deposited, and said dough batches being successively supplied to the extrusion press for individual expression therefrom.

This invention has for another object to provide a novel machine for producing long paste products which is labor and time saving, while also being more efficient from a sanitary standpoint.

The invention has for a further object to provide a novel apparatus comprising, in combination, a batch extrusion press for producing linearly spaced paste strings and a loading press, together with control means whereby these presses are operated in such timed relation that dough is intermittently supplied from the loading press to the extrusion press to successively form batches thereof for extrusion by the latter in ready spaced strings suitably disposed for immediate application to drier racking rods with a minimum of labor and handling.

Other objects of this invention, not at this time more particularly enumerated, will be understood from the following detailed description of the same.

To illustrate the novel method for producing alimentary paste products according to this invention, one illustrative form of apparatus for carrying out the same is shown in the accompanying drawings, in which:

Fig. 1 is a schematic view showing hydraulically operated batch extrusion and loading presses together with control means for mutually coordinating their operations in relation one to the other, said presses being shown in section; Fig. 2 is an enlarged vertical cross sectional view of the presses; Fig. 3 is a fragmentary horizontal section taken on line 3—3 in Fig. 2; and Fig. 4 is a detail perspective showing extrusion of the paste strings and method of applying the same to a drier racking rod.

Similar characters of reference are employed in the above described views, to indicate corresponding parts.

In carrying out the novel method for producing long alimentary paste products according to this invention a batch extrusion press is provided together with a loading press to serve dough thereto.

The dough batch extrusion press comprises a dough batch receiving member 10 provided with an upwardly open rectangular chamber 11 of suitable length, width and height. Supported across the bottom of said chamber 11 is an extrusion die plate 12, preferably so arranged as to be removable for cleaning or replacement. Formed in said die plate, in spaced relation throughout the length thereof, are a plurality of extrusion or die openings 13, terminating at their upper ends in funnel-like intake mouths 14. These extrusion or die openings may be spaced and disposed in a single straight line, or the same may be equally spaced apart longitudinally but in diagonal groups, as shown in Fig. 3, so as to dispose their widened funnel-like intake mouths 14 in such manner as to avoid overlapping or intersection one with another, and yet so as to assure the desired longitudinal space intervals between the strings extended through the die openings proper. Said batch receiving member 10 is suitably supported, as by standards 15 affixed to the ends thereof.

Arranged to enter through the upwardly open top of said batch receiving chamber 11, for vertical reciprocation therein, is a plunger member 16 of corresponding cross-sectional shape. Supported by columns 17 in spaced relation to and above said receiving member 10 is hydraulic ram means. Preferably this hydraulic ram means comprises a pair of vertically disposed downwardly open pressure cylinders 18 equipped with vertically slidable pistons or rams 19, said cylinders 18 being relatively spaced so that their respective pistons or rams 19 engage, and are secured if desired, to the plunger member 16 adjacent to the respective ends of the latter. Spring actuated means is provided for retracting the plunger member 16 and the pistons or rams 19 after an operative stroke thereof. In one illustrative form and arrangement of such spring actuated means, the same comprises brackets 20 suitably affixed to the pressure cylinders 18 to project outwardly therefrom and so as to respectively overhang the respective end portions of the plunger member 16. Affixed to the respective end portions of said plunger member 16 are upwardly extending retractor rods 21 having diametrically enlarged upper end portions 22 which pass slidingly through openings in said brackets 20. Mounted on said retractor rods 21 so as to be abutted by the enlarged upper end portions 22 thereof are spring seating members 23. Suspended from said brackets 20 by carrier rods 24 are spring thrust plates 25, through which the retractor rods 21 slidably extend. Arranged around the retractor rods 21 between the seating members 23 and the thrust plates 25 are compression springs 26. Preferably the upper end portions 22 of said retractor rods 21 are screwthreaded to receive the internally threaded hubs 27 of hand-wheels 28. By turning these handwheels 28 downwardly on the retractor rod end portions 22 until their hubs abut the brackets 20, and then continuing the turning of said handwheels, upward movement (under proper conditions) may be transmitted through the retractor rods 21, against the tension of the springs 26 to thereby lift the plunger member 16 entirely out of the chamber 11, when it is desired to gain access to the die-plate 12 for the purpose of removing and replacing the same.

Provided for cooperation with the batch extrusion press above described is a loading press. One form of loading press suitable to be employed comprises a pedestal 29 to support a bed-plate 30. Said bed-plate 30 is suitably connected with or may form an integral extension of the dough batch receiving member 10 of the above described extrusion press. Extending axially upward from said bed-plate 30 are a pair of laterally spaced upstanding columns 31 and 32. Affixed to the upper end portions of said columns 31 and 32, in bridging relation across and between the same, is the bridging base 33 of a hydraulic ram means, the same comprising an upstanding pressure cylinder 34. Vertically movable in said pressure cylinder 34 is a ram 35 having at its lower outwardly projecting free end a dough expressing piston 36 of somewhat enlarged diameter, and at its upper inner end a piston head 37 to slidably engage the walls of the pressure cylinder chamber. Since the body of the ram 35 is of less external diameter than the internal diameter of the pressure cylinder chamber, an annular fluid receiving chamber 38 is formed around the ram and beneath the enlarged piston head 37. This annular chamber 38 is closed at its lower end by bottom ring 39 suitably affixed to the pressure cylinder structure.

Pivotally supported upon the column 31 are a pair of dough supply cylinders 40 and 41 having intermediate pivoting yokes 42. Slidable on said column 31 is a sleeve 43 having an annular abutment or stop flange 44 at its lower extremity. The upper pivoting yoke 42 swivels on said sleeve 43, while the lower pivoting yoke both swivels and slides directly on said column 31. By this arrangement the dough supply cylinders may be revolved about said column 31 so as to selectively bring either of the same into operative vertical alignment with the pressure cylinder 34 and its ram 35, while the other is outwardly offset in a position to be charged with dough. Each dough supply cylinder is provided on the outer side thereof with hook-like keeper arms 45 adapted to straddle or embrace the column 32, when the dough supply cylinder from which they project is operatively aligned with the pressure cylinder 34 and its ram, thus stopping and holding said dough cylinder in such aligned operative position.

Formed in the bed-plate 30, in axial alignment with the pressure cylinder 34 and its ram 35, is an upwardly open receiving mouth 46 of a dough discharge passage 47. Said receiving mouth 46 is bounded by an annular externally chamfered coupling shoulder 48 adapted to receive engagement of the internally chamfered coupling seats 49 with which the lower open ends of the dough supply cylinders 40 and 41 are provided. Said dough discharge passage 47 is branched to communicate with intake ports 50 formed in the receiving member 10 of the dough batch extrusion press so as to open into the chamber 11 of the latter above the die-plate 12 thereof.

Means are provided for delivering and discharging actuating fluid to and from the hydraulic ram means which serve the respective batch extrusion and loading presses, together with means for controlling the fluid flow so as to properly coordinate the operations of said presses. Such means comprises a control valve A which serves the hydraulic ram means for operating the loading press, and a control valve B which serves the hydraulic ram means for operating the batch extrusion press. Cooperative with the control valve A is a tank or reservoir 51 to contain the fluid served to the hydraulic ram means of the loading press through the agency of a pump 52 which is preferably electrically driven by a motor 53, but which may be otherwise actuated; the intake of said pump 52 being connected by a supply pipe 54 to said tank or reservoir 51. Cooperative with the control valve B is a tank or reservoir 55 to contain fluid served to the hydraulic ram means of the batch extrusion press through the agency of a pump 56, which is also preferably driven by a motor 57, but which may be otherwise driven if desired; the intake of said pump 56 being connected by a supply pipe 58 to said tank or reservoir 55.

The valve A is connected by pipe 59 to the discharge side of said pump 52; and through pipe 60 to the interior of the pressure chamber 34 above the piston head 37 of the ram 35; and through pipe 61 back to the tank or reservoir 51.

The valve B is connected by pipe 62 to the discharge side of said pump 56; and through branched pipe 63 to the interiors of the pressure cylinders 18 above their rams 19; and through pipe 64 back to the tank or reservoir 55. Connected between the branched pipe 63 and the pipe 62 is a by-pass pipe 65, in the line of which is included a spring tensioned back-flow check-valve 66, the spring of which is set at a desired predetermined pressure.

Said control valves A and B are arranged to be actuated by electrical control means suitably cooperating with the respective shift lever arms a and b thereof. For example, an actuating solenoid A1 serves to set valve A for delivery of pumped fluid to the loading press pressure cylinder 34, while a similar solenoid A2 serves to set valve A to by-pass or return pumped fluid back to the tank 51 and to shut-off delivery of said pumped fluid to the loading press pressure cylinder 34. Valve B is balanced, as by springs b' or otherwise, in a normal or neutral condition wherein pumped fluid is by-passed or returned directly to the tank 55, while flow both to and from the pressure cylinders 18 is shut off. An actuating solenoid B1 serves to set valve B for delivery of pumped fluid through branched pipe 63 to the pressure cylinders 18 while back flow pipe 64 is closed; and actuating solenoid B2 serves to set valve B to permit both back flow of fluid from pressure cylinders 18 through pipes 63 and 64 to tank 55, while at the same time also by-passing the pumped fluid back to said tank.

To control the valve actuating solenoids in such manner as to properly coordinate the operations of the presses in relation one to the other, control switch means S is included in the electrical circuits of said solenoids, said switch means being adapted to be actuated by the operative and retractive strokes of the batch extrusion press plunger. Said switch means S is supplied with electric current from a suitable source through the line 70. Said line 70 may include a manual cut-out switch M. Said switch means S is of a two-way type, having an outlet 71 and an outlet 72 selectively connectible by its switching means to the supply line 70 through the operation of the switch actuating push-bar 73. Carried by the batch extrusion press plunger 16, so as to move up and down therewith, is a switch actuator, having vertically spaced upper and lower arms 74 and 75, each said arm having an adjustable stop-screw 76' opposed respectively to the respective ends of the switch actuating push-bar 73.

Switch outlet 71 is connected by line 76 to one pole of solenoid A1, the other pole of which is connected to the return line 77 of the current supply circuit. Switch outlet 71 is also connected through the branch line 78 to one pole of solenoid B2, the other pole of which is connected to the return line 77 of the current supply circuit. Said branch line 78 includes an auxiliary interrupter switch means 79, adapted to be actuated by an adjustable push-piece 80 which is carried by bracket arm 81 affixed to and which moves up and down with said batch extrusion press plunger 16.

Switch outlet 72 is connected by line 82 to one pole of solenoid B1, the other pole of which is connected to the return line 77 of the current supply circuit. Switch outlet 72 is also connected by branch line 83 to one pole of solenoid A2, the other pole of which is connected to the return line 77 of the current supply circuit.

In carrying out the novel method of producing extruded linearly spaced strings of alimentary paste ready for direct application to drier racking rods, a dough supply cylinder (as e. g. the cylinder 40) having been charged with dough and thereupon moved into alignment with the ram 35 of the loading press and lowered into engagement with the coupling shoulder 48 and into operative communication with the mouth 46 of the dough discharge passage 47, assume that a bath of dough has been delivered into the chamber 11 of the batch extrusion press, and that the raised plunger 16 of the latter has caused the stop screw 76' of the lower switch actuator arm 75 to push upwardly switch push-bar 73 so as to close an electrical circuit through the outlet 72 of control switch S. Under such circumstances, current is delivered through line 82 to energize solenoid B1 so as to set valve B in condition to deliver pumped fluid through pipe line 63 into the extrusion press cylinders 18, while at the same time current is delivered through branch line 83 to energize solenoid A2 so as to set valve A to shut off delivery of pumped fluid to loading press pressure cylinder 34. The fluid entering the extrusion press cylinders 18 actuates the rams 19 thereof to effect an operative downward stroke of the plunger 16, thus extruding the batch of dough through die plate 12 and forming the linearly spaced strings of paste P ready for application to a drier racking rod R (see Fig. 4). It will be seen in Fig. 4 that the paste strings P are extruded through the die plate 12 so as to form a line thereof the individual strings of which are equally spaced apart. When extrusion is complete, the operator may press a drier racking rod R laterally against the mid portions of the strings, and thereupon by moving the rod R forwardly and upwardly thereby cause the strings P to drape themselves over the rod as indicated by the broken line showing thereof in said Fig. 4. When engaged by the rod R, the strings may be cut away from the die plate, so that the freed end portions drop downward to thus suspend the strings on the rod. The application of the strings P to the rod R may be accomplished by hand, or suitable mechanism (not shown) may be utilized to convey the rods into engagement with the strings, and then to move the rods so as to cause the desired draping of the strings thereover.

It will be understood that the die openings 13 of the die plate 12 may be arranged to form one or more parallel groups of spaced strings, each such string being applicable to a drier racking rod.

As the extrusion press plunger 16 reaches the limit of its operative stroke, the stop screw 76' of the upper switch actuator arm 74 engages the switch push bar 73 so as to push the same downwardly thus breaking the connection with switch outlet 72 and making connection with switch outlet 71 of control switch S. Under these circumstances, solenoids B1 and A2 are de-energized, and solenoid A1 is energized so as to set valve A in condition to deliver pumped fluid to loading press pressure cylinder 34, while at the same time current is delivered through branch line 78 and closed interrupter switch 79 to energize solenoid B2 so as to set valve B in condition to permit direct back flow of fluid from extrusion press cylinders 18 through pipe lines 63 and 64 to tank 55. Under these conditions, the retractor springs 26, which were tensionally compressed by the down stroke of extrusion press plunger 16, function to retract or raise said plunger 16, while in the meantime the delivery of fluid to loading press pressure cylinder 34 forces downwardly the ram 35 against the dough in supply cylinder 40, thereby forcing a portion of said dough through the passage 47 and ports 50 into the batch extrusion press chamber 11, to deliver another dough batch to the latter. As the extrusion press plunger 16 rises, the adjustable push-piece 80, carried by the bracket arm 81 thereof, engages and opens the interrupter switch 79, thus interrupting delivery of current through branch line 78 and thus de-energizing solenoid B2, so that, under the balancing springs b', valve B returns to a neutral position, thus obstructing direct back-flow of fluid from extrusion press cylinders 18 to tank 55. This condition occurs before the plunger 16 rises to the point at which throw of the control switch S to deliver current through its outlet 72 occurs, and while said control switch S is still conditioned to deliver current through outlet 71. As a consequence of this current still energizes solenoids A1, and fluid is therefore still being delivered to loading press pressure cylinder 34 to actuate ram 35 and continue delivery of dough into extrusion press chamber 11. Since, however, direct back-flow of fluid from extrusion press cylinders 18 to tank 55 is thus prevented, the continued pressure of incoming dough entering extrusion press chamber 11 is exerted with uplifting effect upon extrusion press plunger 16, which yields to such pressure by movement of fluid through pipe lines 63 and 65 against the tensional backflow check valve 66 until the rise of plunger 16 reaches that limit at which control switch S is actuated to break connection delivering current through outlet 71 and again conditioning said control switch S for delivery of current through outlet 72, whereupon the cycle of operations above described is repeated.

By reason of the fact that the back-flow check valve 66 is set to yield only at a predetermined back pressure, the result of such continued delivery of dough has the effect of packing the dough entered in the extrusion press chamber into a compact dense mass free from air bubbles or voids, so that the instant the rams 19 are actuated to initiate an extrusion stroke of the plunger 16, there is no lost motion and immediate extrusion of the dough through the die occurs. Furthermore, the absence of air voids in the expressed dough assures the formation of solid and perfect paste strings free from weak spots.

It will be noted that, during cycles of the above described operations, whereby batches of dough are successively delivered from the loading press to the extrusion press and successively extruded from the latter, the ram 35 of said loading press is caused to intermittently descend with timed dough batch delivering and forming effect. When, however, said ram 35 reaches the downward limit of its operative movement, at which point the dough content of the supply cylinder 40 has been expressed, means are provided for returning said ram 35 to uplifted initial position. Illustrative of such means, a secondary valve C is provided, the same being connected by pipe 90 to the discharge side of pump 52; through pipe 91 to the interior of annular chamber 38 of loading press ram means; and through pipe 92 to the interior of pressure cylinder 34 above the piston head 37; and through pipe 93 back to tank 51. The control lever c of said valve C is controlled by a ram actuated trip means, comprising a pivoted trip lever 94, connected by link 95 to lever c. Said trip lever 94 possesses upper and lower trip arms 96 and 97. Said upper arm 96 is engaged by a slide bolt 98 disposed to be engaged by the descending movement of the ram piston head 37 so as to throw the trip lever in position to set the valve C for delivery of pumped fluid into chamber 38, while connecting interior of pressure cylinder 34 for back-flow of fluid therefrom to tank 51. Said lower arm 97 is engageable by the piston 36, on rising of ram 35, so as to throw the trip lever in position to set valve C in position to shut off back flow of fluid therethrough from pressure cylinder 34 to tank 51, while permitting back flow of fluid therethrough from chamber 38 to tank 51.

After the ram 35 of loading press is returned to normal initial position, the apparatus may be stopped by opening manual switch M, whereupon supply cylinder 41, which has in the meantime been provided with a supply of dough, may be revolved into operative relation to the loading press ram, while the empty supply cylinder 40 is positioned for recharging with dough. When the cylinder 41 is in place the apparatus may be again operated to successively extrude batches of dough in linearly spaced strings ready for direct application to drier racking rods. It will be obvious that any suitable means, already well known to the art, may be utilized in raising and lowering the supply cylinders 40 and 41 as the same are from time to time shifted into and out of operative relation to the loading press ram.

From the above description of my invention it will be obvious that the same provides a novel and highly efficient method of extruding alimentary paste strings in such aligned and spaced relation as to permit the direct application thereof to the drier racking rods with a minimum of handling, and by such procedure that the dough supply is successively divided into batches, each batch being sufficient to form a supply of prearranged and spaced strings to accommodate the drier racking rod capacity.

While for the purposes of illustrating the novel paste extrusion method, I have shown and described the valves A and B as controlled by electro-mechanical means, it will be understood that such control means may comprise means functioning through entirely mechanical agencies or hydraulically.

It will also be obvious that the described apparatus, which constitutes one means of carrying out the novel method of this invention, in the novel arrangement and means of controlling in combination a loading press and an extrusion press, provides novel apparatus per se by which a continuous operation may be automatically attained with respect to each supply mass of dough submitted to the action of the loading press.

I am aware that various changes could be made in the method of procedure and in apparatus utilized therein without departing from the scope of my invention as defined in the following claims; hence it is intended that all matter contained in the above description or shown in the accompanying drawings shall be interpreted as illustrative and not in a limiting sense.

I claim:

1. In apparatus for the purposes described, an extrusion press comprising a fixed dough receiving chamber of a capacity substantially limited to that required to emit a given number and length of paste strings and having a die the openings of which are disposed to emit paste strings in linearly spaced relation to provide a row thereof of a length to be accommodated upon a drier racking rod, and a plunger reciprocable in said chamber in opposition to said die, hydraulic ram means to effect extrusion strokes of said plunger, spring means to retract said plunger and ram means and timed loading automatically controlled means in communication with said extrusion press dough receiving chamber to supply single dough batches thereto after retraction of said plunger preparatory to each extrusion stroke thereof.

2. In apparatus for the purposes described, the combination of an extrusion press and a loading press; said extrusion press comprising a dough receiving chamber having a die the openings of which are disposed to emit paste strings in linearly spaced relation to provide a row thereof of a length to be accommodated upon a drier racking rod, a plunger reciprocable in said chamber in opposition to said die, hydraulic ram means to effect extrusion strokes of said plunger, and spring means to retract said plunger and ram means; said loading press comprising a dough supply chamber, means of communication between said latter chamber and said extrusion press receiving chamber, hydraulic ram means for delivering dough from said supply chamber to said extrusion press receiving chamber, and means to cause intermittent actuation of said loading press ram means to supply dough to said extrusion press receiving chamber after retraction and preparatory to each extrusion stroke of said extrusion press plunger.

3. In apparatus for the purposes described, the combination of an extrusion press and a loading press, said extrusion press comprising a dough receiving chamber having a die the openings of which are disposed to emit paste strings in linearly spaced relation to provide a row thereof of a length to be accommodated upon a drier racking rod, a plunger reciprocable in said chamber in opposition to said die, hydraulic ram means to effect extrusion strokes of said plunger, and spring means to retract said plunger and ram means; said loading press comprising a dough supply chamber, means of communication between said latter chamber and said extrusion press receiving chamber, hydraulic ram means for delivering dough from said supply chamber to said extrusion press receiving chamber; electrically actuated fluid control valve means to serve the hydraulic ram means of said extrusion and loading presses, electrical circuits serving said valve means including control switch means adapted to be actuated by the operative and retractive strokes of said extrusion press plunger to cause operation of said extrusion and loading presses in timed alternation whereby a dough batch is supplied by said loading press to said extrusion press chamber after retraction and preparatory to each extrusion stroke of said extrusion press plunger.

4. In apparatus for the purposes described, a dough receiving chamber provided with a die the openings of which are disposed to emit paste strings in linearly spaced relation to provide a row thereof of a length to be accommodated upon a drier racking rod, a hydraulically actuated extrusion plunger reciprocable in said chamber in opposition to said die, a dough supply reservoir having means of communication with said dough receiving chamber, a hydraulically actuated feed plunger cooperative with said supply reservoir, and means to cause said plungers to be actuated in timed alternation whereby a dough batch is supplied to said receiving chamber after retraction and preparatory to each extrusion stroke of said extrusion plunger.

5. In apparatus for the purposes described, a dough receiving chamber provided with a die the openings of which are disposed to emit paste strings in linearly spaced relation to provide a row thereof of a length to be accommodated upon a drier racking rod, a hydraulically actuated extrusion plunger reciprocable in said chamber in opposition to said die, a dough supply reservoir having means of communication with said dough receiving chamber, a hydraulically actuated feed plunger cooperative with said supply reservoir, electrically actuated fluid control valve means to serve the hydraulically actuated extrusion and feed plungers, electrical circuits serving said valve means including control switch means adapted to be actuated by the reciprocative movements of said extrusion plunger to thereby automatically set said valve means to induce timed alternated operation of said feed and extrusion plungers, whereby a dough batch is supplied from said reservoir to said receiving chamber upon retraction and preparatory to each extrusion stroke of said extrusion plunger.

6. In apparatus for the purposes described, a dough receiving chamber provided with a die the openings of which are disposed to emit paste strings in linearly spaced relation to provide a row thereof of a length to be accommodated upon a drier racking rod, an extrusion plunger reciprocable in said chamber in opposition to said die, a dough supply reservoir having means of communication with said dough receiving chamber, a feed plunger cooperative with said supply reservoir, and means to cause said plungers to be actuated in timed alternation whereby a dough batch is supplied to said receiving chamber upon retraction and preparatory to each extrusion stroke of said extrusion plunger.

7. In apparatus for the purposes described, the combination of an extrusion press and a loading press, said extrusion press having a fixed dough receiving chamber provided with a die the openings of which are disposed to emit paste strings in linear spaced relation to provide a row thereof of a length to be accommodated upon a drier racking rod, dough expressing means cooperative with said chamber, means providing communication between said loading press and said extrusion press chamber, means to feed dough from said loading press through said communication means to said extrusion press chamber, and means to actuate said feeding means in timed alternation to the operation of the extrusion press dough expressing means whereby a dough batch is supplied to the extrusion press chamber prior to each extrusion stroke of said dough expressing means.

8. In apparatus for the purposes described, an extrusion press including a fixed dough receiving chamber provided with a die the openings of which are disposed to emit paste strings in linearly spaced relation to provide a row thereof of a length to be accommodated upon a drier racking rod, an extrusion plunger reciprocable in said chamber in opposition to its die, means to reciprocate said extrusion plunger, said chamber having a capacity to accommodate a dough batch limited to that required to emit a given number of paste strings of desired predetermined length when entirely extruded by a complete single continuous downstroke of the extrusion plunger, a dough supply reservoir, means providing communication between said supply reservoir and extrusion press chamber, said supply reservoir having a capacity adapted to accommodate, when fully charged, a quantity of dough sufficient to provide a plurality of batches for successive delivery to said extrusion press chamber, a feed plunger cooperative with said supply reservoir, and means to produce intermittent operative impulses of said feed plunger in timed alternation with operative reciprocations of said extrusion plunger whereby successive dough batches are supplied to said extrusion press chamber from said supply reservoir respectively prior to each operative stroke of said extrusion plunger.

JOSEPH DE FRANCISCI.